United States Patent [19]
Young

[11] 3,914,710
[45] Oct. 21, 1975

[54] POLARIZED CONTINUOUS WAVE CRYSTALLINE LASER

[75] Inventor: Donald S. Young, Windham, N.H.

[73] Assignee: Sanders Associates, Inc., South Nashua, N.H.

[22] Filed: May 6, 1974

[21] Appl. No.: 467,352

[52] U.S. Cl.......... 331/94.5 C; 331/94.5 P; 330/4.3
[51] Int. Cl.²...................... H01S 3/05; H01S 3/086
[58] Field of Search...................... 331/94.5; 330/4.3

[56] References Cited
UNITED STATES PATENTS
3,702,974  11/1972  Koechner et al............... 331/94.5 T OTHER PUBLICATIONS
Di Domenico, J., Applied Physics, Vol. 35, No. 10, Oct. 1964, pp. 2870–2876.

*Primary Examiner*—Robert J. Webster
*Attorney, Agent, or Firm*—Louis Etlinger; Richard I. Seligman

[57] ABSTRACT

A beam splitting polarizer is positioned in a laser cavity consisting of a laser rod and two highly reflecting mirrors. The laser rod is continually pumped, producing thermally induced stress birefringence in the laser rod, which performs a polarization rotation which is used to couple energy via the polarizer from inside the laser cavity. The stress pattern in the laser rod can be changed by rotation of the plane containing the pumping lamp and laser rod axes while keeping the beam splitter polarizer stationary. Two cavity configurations are shown, one in which the HR mirrors are arranged in opposed facing relationship, and the other with the mirrors being arranged orthogonally with respect to each other, and the beam splitting polarizer which is utilized for obtaining the polarization component with the largest gain. The gain of each of these configurations can be controlled by the aforesaid rotation of the pump lamp and laser rod with respect to the beam splitting polarizer.

7 Claims, 5 Drawing Figures

- ○—○—○— ORDINARY (VERTICAL) POLARIZATION
- ↑↑↑ EXTRAORDINARY (HORIZONTAL) POLARIZATION

POLARIZED CONTINUOUS WAVE CRYSTALLINE LASER

The invention herein described was made in the course of or under a contract or subcontract thereunder with the Department of the Navy.

BACKGROUND OF THE INVENTION

This invention relates to a laser device, and more particularly to a continuous wave plane polarized laser.

It is often desirable to have a laser which produces an output having a continuous wave plane polarized beam for those applications requiring long coherence length, stability, measurement of the properties of materials, orientation or positioning of remote objects, and other such applications. The problem, then, is the generation of large amounts of CW plane polarized power by means of a laser whose output is normally randomly polarized. Normally, a plane polarized laser beam is obtained by placing a polarizer in the laser cavity and extracting the beam from one of the laser mirrors which is partially transmissive. This technique is inefficient, since power from one of the polarization components is removed at the polarizer Furthermore, compensation for stress birefringence and thermofocusing are difficult to achieve.

Another method utilized for extracting energy from the laser cavity is called the Pulsed Transmission Mode (PTM) in which the energy is extracted from the center of the laser cavity instead of through one of the mirrors. This technique requires the addition of a lossy polarization rotation device, such as a Pockels cell, Kerr cell, or other suitable device in addition to a Q-switch. The addition of these lossy polarization rotators limits the possibility of achieving high output powers at high repetition rates.

Accordingly, it is an object of this invention to provide a new and improved laser for the generation of large amounts of CW plane polarized power.

Another object of this invention is to provide a new and improved laser in which polarized energy is coupled from the inside of the laser cavity rather than through a partially transmissive mirror for improving the efficiency and output of the polarized laser.

A further object of this invention is to provide a new and improved polarized laser which is easier to compensate for thermally induced effects and focusing in a solid optically pumped laser.

Still another object of this invention is to provide a new and improved CW plane polarized laser which facilitates electro-optic Q-switching at high repetitive rates while achieving high peak power outputs.

SUMMARY OF THE INVENTION

In carrying out this invention in one illustrative embodiment thereof, a laser for the generation of CW plane polarized radiation is provided having a crystalline laser rod and a beam splitting polarizer bounded by a pair of highly reflective mirrors which form a laser cavity therebetween. Pumping means are provided for continually pumping the laser rod, causing thermally induced stress birefringence in the laser rod to perform a polarization rotation whereby polarized radiation is coupled from the cavity via the beam splitting polarizer.

DESCRIPTION OF THE PREFERRED EMBODIMENTS

Figure 1:
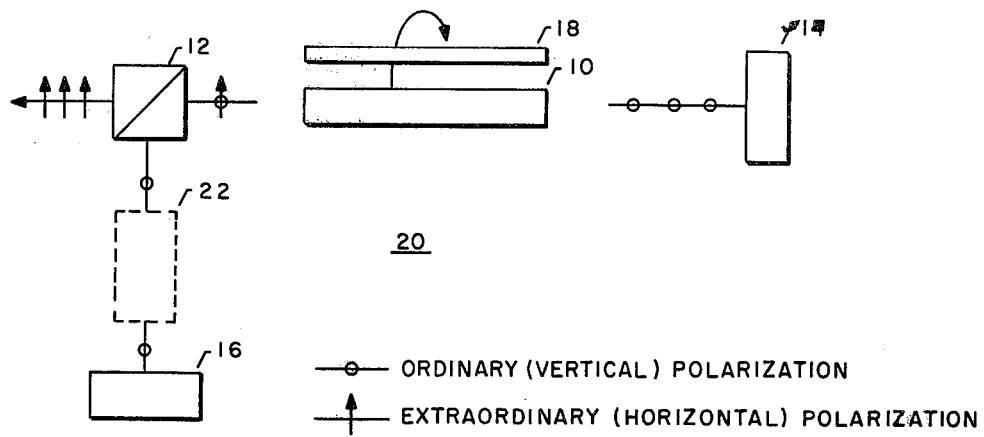
FIG. 1 is a schematic diagram of one configuration of the laser embodied in this invention.

Referring now to FIG. 1, the laser rod 10 and a beam splitter polarizer 12 are bounded by a pair of highly reflective mirrors 14 and 16 to form a laser cavity 20 therebetween. The laser rod 10 may be any type of solid crystalline rod which exhibits thermally induced stress birefringence, for example a neodymium yttrium aluminum garnet (Nd : YAG). The beam splitting polarizer 12 may be of any suitable type which passes radiation of one polarization component through one face thereof while reflecting another polarization component thereof in a different direction to the first, for example a Glan Thompson prism. The highly reflective mirrors 14 and 16 are preferably substantially 100% reflecting. An optional Q-switch 22, for example a Pockels cell, may be included in the laser cavity 20. The laser rod 10 is continually pumped by a pump lamp 18 of any suitable type, for example, a tungsten lamp. Since an important concept of the present invention resides in the utilization of thermally induced stress birefringence in the laser rod, a continually pumped device is utilized because it exhibits more stress birefringence than do flash lamp pump devices, due to the greater heat generated in the laser rod 10.

Figure 2:
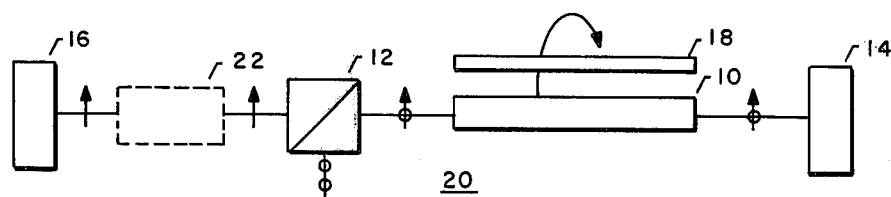
FIG. 2 is a schematic diagram of an alternative configuration of the laser embodied in this invention.

The configuration shown in FIG. 2 is similar to the orthogonal configuration shown in FIG. 1, except that the highly reflective mirrors 14 and 16 are arranged in opposed facing relationship, with the polarization component coupled from a different face of the beam splitter polarizer 12. The difference resides, then, between FIG. 1 and FIG. 2, in the component of polarization which is coupled out of the center of the laser cavity 20. In the configuration of FIG. 1, the extraordinary or horizontal polarization component is derived, while in FIG. 2 the ordinary or vertical polarization component is coupled out. Accordingly, the use of the configuration shown in FIG. 1, or the alternative configuration shown in FIG. 2, is predicated on oscillating the mode, $Tem_{oo}$, or higher order with the largest gain. Therefore, the configuration shown in FIG. 2 would be used if it were determined that the ordinary component of polarization had the highest gain.

Figure 3:
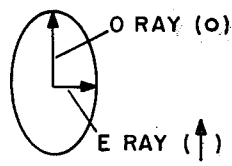
FIGS. 3 and 4 illustrate how the stress pattern in the laser rods of FIGS. 1 and 2 may be altered by rotating the pump lamp and laser rod.
Figure 4:
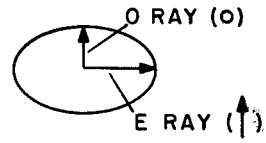

The stress pattern in the laser rod 10 can be changed by a rotation of the plane containing the pump lamp 18 and laser rod 10 axes, and keeping the beam splitter polarizer stationary. This is illustrated in FIG. 3 and FIG. 4, with FIG. 3 showing greater gain for the O-ray (vertical polarization component) with the pump lamp and laser rod positioned as shown, and FIG. 4 indicating a maximizing of the extraordinary polarization component. Accordingly, the gain of each one of these polarization components can be controlled by a rotation of the pump lamp 18 and laser rod 10 moving as a unit with respect to a stationary beam splitter polarizer 12.

Figure 5:
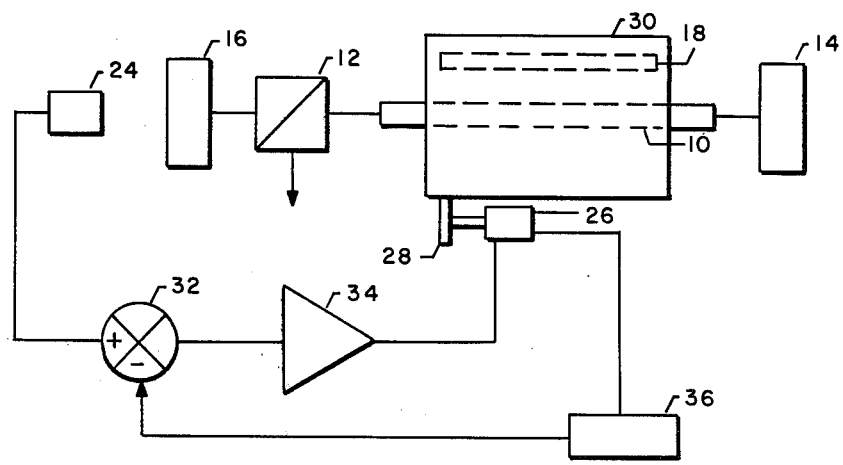
FIG. 5 is a schematic diagram illustrating one means of rotating the laser housing for optimizing polarized output from the laser cavities of FIGS. 1 and 2.

FIG. 5 illustrates one form of means for rotating the plane containing the pump lamp 18 and laser rod 10 around an axis containing the laser beam. FIG. 5 uses the same configuration shown in FIG. 2 but can be equally applied to the configuration of FIG. 1. A cylindrical laser housing 30 is provided which has mounted therein the lamp 18 and laser rod 10. Accordingly, the rotation heretofore referred to can be accomplished by rotation of the cylindrical housing 30. An output sensor 24 is positioned to monitor the small amount of laser radiation that leaks through the HR mirror 16. The output of sensor 24, using a standard null servo technique, drives motor 26 which rotates a drive wheel 28 for controlling the rotation of cylindrical housing 30. A null in the output energy of the extraordinary polarization will indicate a maximum in the output of the ordinary polarization. The output from detector 24, which is, for example, a silicon detector, is applied to a summer 32, the output from which is applied to motor 26 via a servo amplifier 34. The output of motor 26 is coupled to summer 32 via preferably a tachometer 36. Tachometer 36 integrates out any jitter in the system. The control of rotation of the cylindrical housing 30 by the motor 26 can be utilized to maximize polarized output power from the laser cavity 20.

In operation of either FIGS. 1 or 2, the laser rod 10 is optically pumped by the light emitted from the pump lamp 18. This pumping action heats the laser rod and produces thermally induced stress birefringence therein which performs a polarization rotation which is used to couple the energy from the laser cavity out of the beam splitter polarizer 12. Optimization of this coupling is achieved by changing the stress pattern in the laser rod by rotating the laser rod 10 and pump lamp 18 with respect to the stationary polarizer 12. The amount of this coupling would be optimized, depending on the gain of the oscillating laser cavity 20. Again, the important feature here is that the stress birefringence performs the polarization rotation which allows the beam coupling as shown in FIGS. 1 or 2. Whether the configuration of FIG. 1 or FIG. 2 is utilized would depend on whether the ordinary or extraordinary polarization component produces the largest gain. Since the stress birefringence is utilized for performing the polarization rotation, automatic compensation is provided for stress birefringence, and further, compensation for thermal focusing can be more easily accomplished utilizing convex surfaces or similar techniques.

The configurations of FIGS. 1 and 2 can also be utilized for repetitive Q-switching operations. In this mode, the laser rod 10 is pumped by the pump lamp 18 as before. Oscillation is prevented by placing a high voltage on the Q-switch 22, which rotates the ordinary polarization through 90° (FIG. 1) after a double pass, thereby inhibiting oscillation. Oscillation can then only exist in the cavity 20 when the high voltage is removed from the Q-switch 22 and population inversion achieved. Upon removal of the high voltage, oscillation occurs, and it is coupled out via the stress birefringence in the laser rod 10.

As merely an example of the results which may be achieved utilizing the present invention, an Nd:YAG laser rod excited by 3,000 watts from a tungsten lamp yielded 9.5 watts of plane polarized output power utilizing the configuration of FIG. 1. Only 2.5 watts of plane polarized power was obtained by placing a polarizer in the same type of laser having a conventional laser cavity.

Since other modifications and changes, varied to fit particular operating requirements and environments, will be apparent to those skilled in the art, the invention is not considered limited to the examples chosen for purposes of disclosure, and covers all modifications which do not constitute departures from the true spirit and scope of this invention.

I claim:

1. A laser for the generation of CW plane polarized radiation comprising:
   a. a crystalline laser rod,
   b. a beam splitting polarizer,
   c. a pair of highly reflective mirrors,
   d. said laser rod and said beam splitting polarizer being bounded by said mirrors and in optical alignment therewith forming a laser cavity therebetween,
   e. pumping means for continually pumping said laser rod causing thermally induced stress birefringence in said laser rod to perform a polarization rotation whereby polarized radiation is coupled from said cavity via said beam splitting polarizer, and
   f. means for rotating said laser rod and pumping means with respect to said beam splitting polarizer for controlling the output of polarized radiation from said beam splitting polarizer.

2. The structure set forth in claim 1 wherein said beam splitting polarizer is a Glan Thompson prism.

3. The structure set forth in claim 1 wherein said laser cavity has a Q switch therein.

4. The structure set forth in claim 3 wherein said Q switch is a Pockels cell.

5. The structure set forth in claim 1 wherein each of said pair of highly reflective mirrors is substantially 100% reflecting.

6. The structure set forth in claim 1 wherein said mirrors are arranged in opposed facing relationship with the polarized radiation output coupled from said polarizer being the ordinary component of polarization.

7. The structure set forth in claim 1 wherein said mirrors are arranged orthogonally with respect to each other and said beam splitting polarizer with the polarized radiation output coupled from said polarizer being the extraordinary component of polarization.

* * * * *